(12) United States Patent
Lee

(10) Patent No.: US 7,172,243 B1
(45) Date of Patent: Feb. 6, 2007

(54) BICYCLE SEAT

(75) Inventor: Ching-Song Lee, Nantou (TW)

(73) Assignee: Cionlli Industrial Co., Ltd., Nantou (TW)

( * ) Notice: Subject to any disclaimer, the term of this patent is extended or adjusted under 35 U.S.C. 154(b) by 0 days.

(21) Appl. No.: 11/264,251

(22) Filed: Nov. 1, 2005

(51) Int. Cl.
*B62J 1/02* (2006.01)

(52) U.S. Cl. .................................. 297/195.1

(58) Field of Classification Search ............ 297/195.1, 297/215
See application file for complete search history.

(56) References Cited

U.S. PATENT DOCUMENTS

| 11,350 | A | * | 7/1854 | Bergfels | 403/247 |
| 470,707 | A | * | 3/1892 | Saunders | 297/215 |
| 4,367,896 | A | * | 1/1983 | Nieddu | 297/195.1 |
| 5,823,618 | A | * | 10/1998 | Fox et al. | 297/201 |
| 6,010,188 | A | * | 1/2000 | Yates | 297/215 |
| 6,056,356 | A | * | 5/2000 | Unger, Jr. | 297/195.1 |
| 6,666,507 | B1 | * | 12/2003 | Ringgard | 297/195.1 |
| 2005/0040683 | A1 | * | 2/2005 | Bugle et al. | 297/195.1 |

* cited by examiner

*Primary Examiner*—Peter R. Brown
(74) *Attorney, Agent, or Firm*—Seyfarth Shaw LLP; Timothy J. Keefer

(57) ABSTRACT

A seat includes: a seat body having a bottom surface and front and rear ends, the bottom surface being formed with a retaining member disposed adjacent to the front end; and a pair of opposing supporting members secured to the bottom surface. Each of the supporting members includes a front end portion extending into the retaining recess unit, an intermediate portion generally round in shape and extending from the front end portion toward the rear end of the seat body, a bent portion bent from the intermediate portion and having a cross-section varied from a generally round shape to a flat shape, and a rear end portion extending from the bent portion and generally flat in shape.

5 Claims, 4 Drawing Sheets

BICYCLE SEAT

BACKGROUND OF THE INVENTION

1. Field of the Invention

The invention relates to a bicycle seat, more particularly to a bicycle seat that is adapted to be mounted on a bicycle frame.

2. Description of the Related Art

As shown in FIG. 1, a seat for a bicycle includes a seat body 2 and a seat support frame 1 mounted on a bottom of the seat body 2. The bottom of the seat body 2 includes a front part provided with an engaging member 201, and a rear part provided with a pair of spaced apart engaging blocks 202. The seat support frame 1 is made from a metal rod bent into a U-shape, and includes a bent end portion 101 that engages the engaging member 201, and a pair of distal end portions 102, each engaging a respective one of the engaging blocks 202.

The seat support frame 1 is bow-shaped so as to be slightly flexible and thereby provide a shock-absorbing effect. However, since the cross section of the entire seat support frame 1 is uniform, the rigidity of the seat support frame 1 is relatively high, thereby limiting the shock-absorbing effect thereof.

SUMMARY OF THE INVENTION

Therefore, the object of the present invention is to provide a bicycle seat that can overcome the drawback associated with the prior art.

Accordingly, a seat of this invention comprises: a seat body having a bottom surface and front and rear ends, the bottom surface of the seat body being formed with a retaining member that is disposed adjacent to the front end, the seat body having a width that increases in a direction from the front end toward the rear end, the seat body defining a center line extending from the front end to the rear end; and a pair of opposing supporting members secured to the bottom surface of the seat body and disposed at two opposite sides of the center line. Each of the supporting members includes a front end portion extending into the retaining member, an intermediate portion extending from the front end portion toward the rear end of the seat body, a bent portion bent from the intermediate portion, and a rear end portion extending from the bent portion in a direction away from the center line. The intermediate portion has a cross section that is generally round in shape. The rear end portion has a cross section that is generally flat in shape. The bent portion has a cross section varied from a generally round shape to a flat shape as the bent portion extends from the intermediate portion to the rear end portion.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
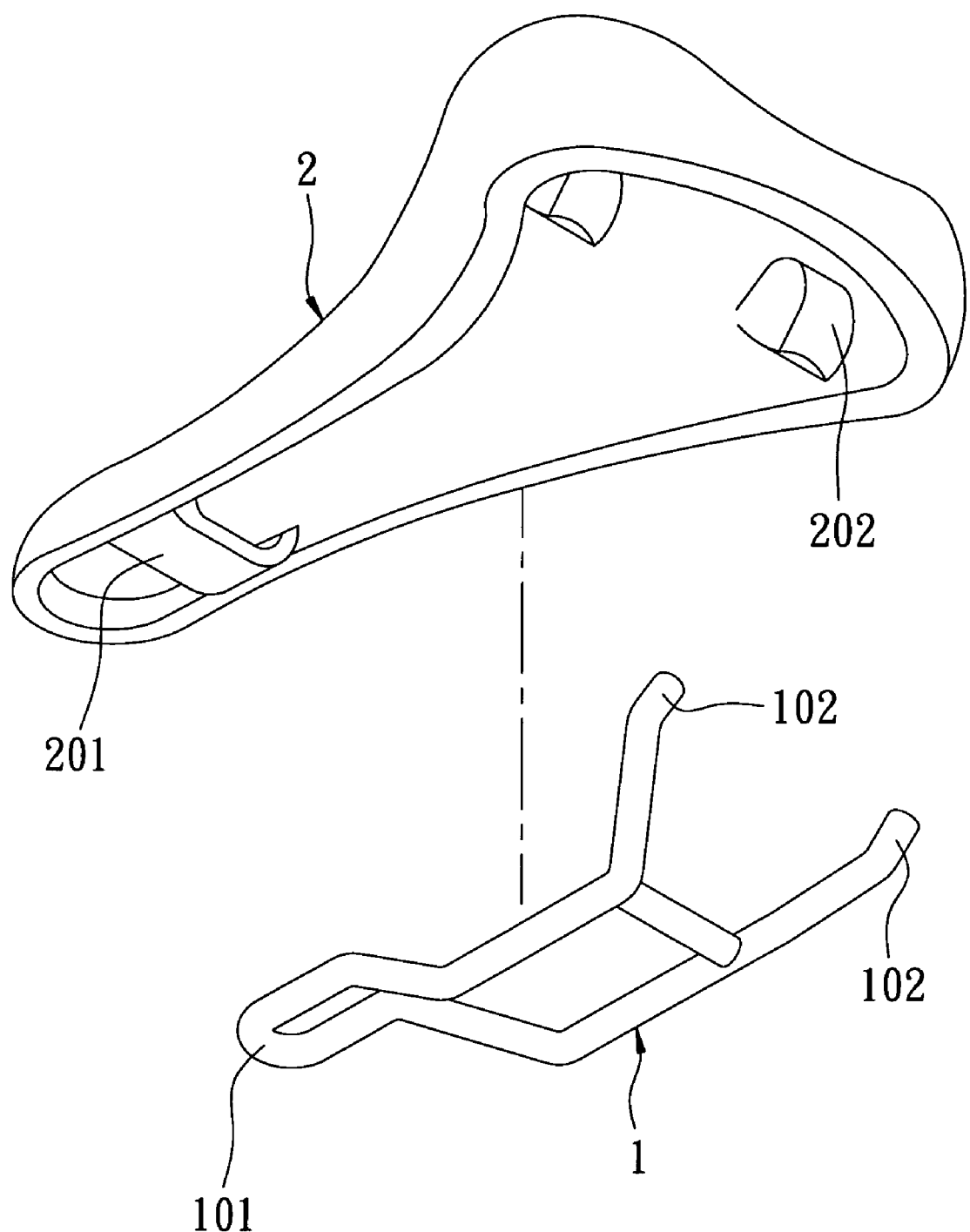
FIG. 1 is an exploded perspective view of a conventional bicycle seat.
Figure 2:
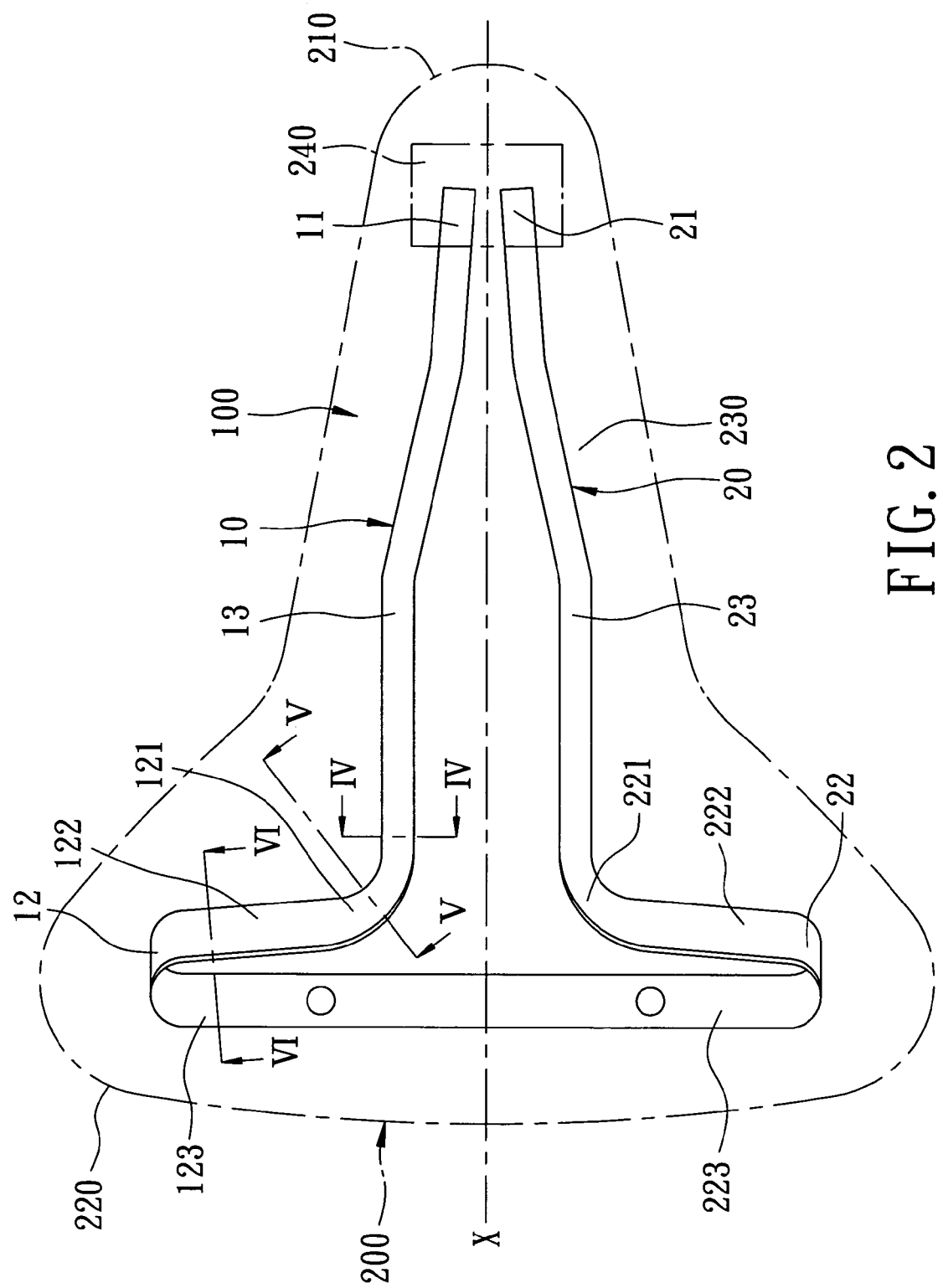
FIG. 2 is a schematic bottom view of the preferred embodiment of a seat according to the present invention.
Figure 3:
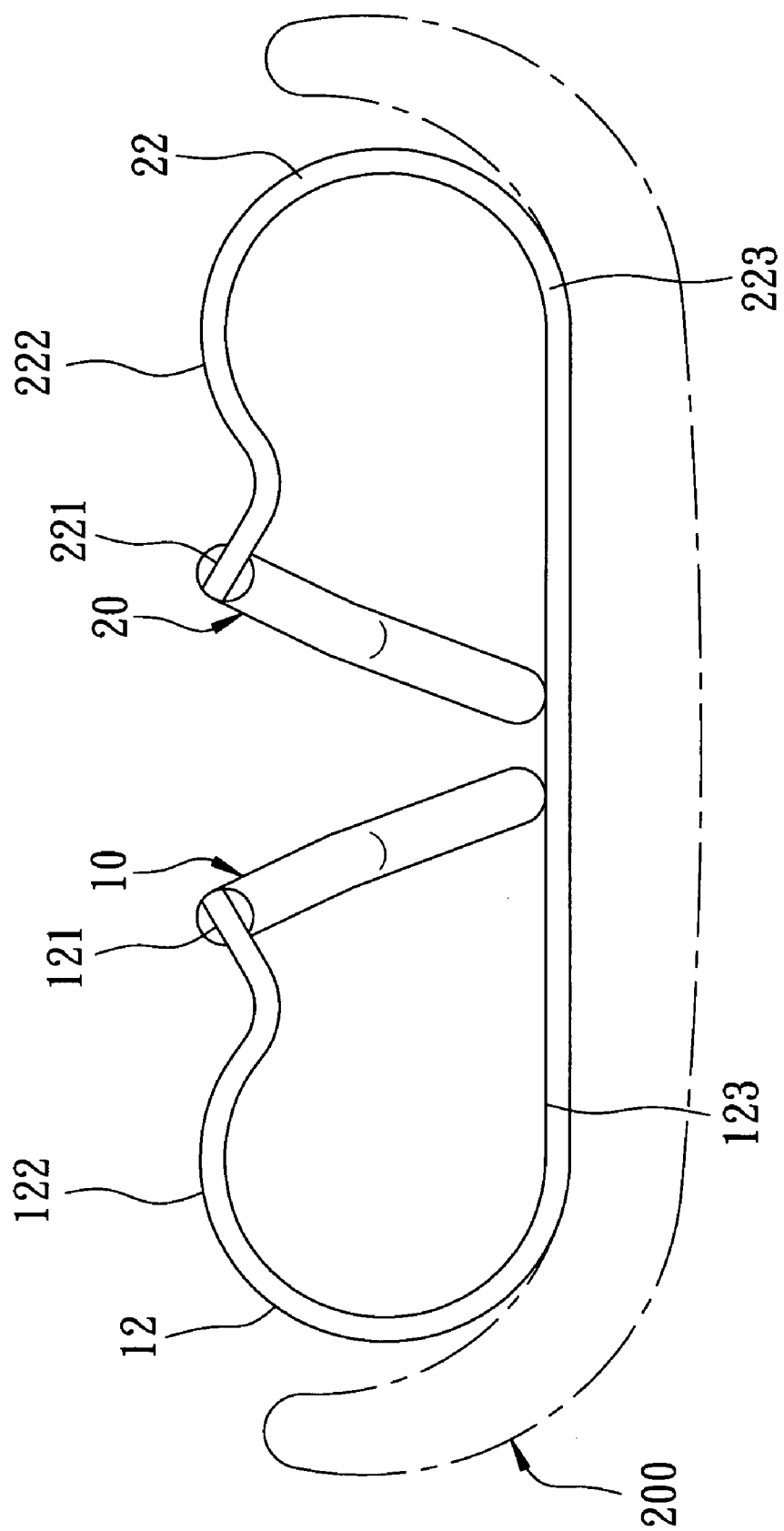
FIG. 3 is a schematic rear view of the preferred embodiment.
Figure 5:
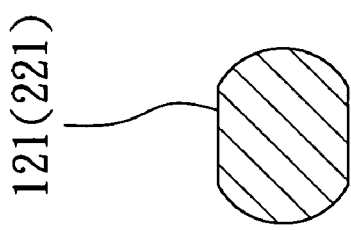
FIG. 5 is a sectional view taken along line V—V in FIG. 2.

Referring to FIGS. 2 and 3, the preferred embodiment of a bicycle seat according to the present invention is shown to include: a seat body 200 having a bottom surface 230 and front and rear ends 210, 220, the bottom surface 230 of the seat body 200 being formed with a retaining member 240 that is disposed adjacent to the front end 210, the seat body 200 having a width that increases in a direction from the front end 210 toward the rear end 220, the seat body 200 defining a center line (X) extending from the front end 210 to the rear end 220; and a pair of opposing supporting members 10, 20 secured to the bottom surface 230 of the seat body 200 and disposed at two opposite sides of the center line (X), each of the supporting members 10, 20 including a front end portion 11, 21 extending into the retaining member 240, an intermediate portion 13, 23 extending from the front end portion 11, 21 toward the rear end 220 of the seat body 200, a bent portion 121, 221 bent from the intermediate portion 13, 23, and a rear end portion 12, 22 extending from the bent portion 121, 221 in a first direction away from the center line (X). In this embodiment, the intermediate portion 13, 23 has a cross section that is generally round in shape. The rear end portion 12, 22 has a cross section that is generally flat in shape. The bent portion 121, 221 has a cross section varied from a generally round shape to a flat shape as the bent portion 121, 221 extends from the intermediate portion 13, 23 to the rear end portion 12, 22, as best shown in FIGS. 4, 5 and 6.

Figure 6:
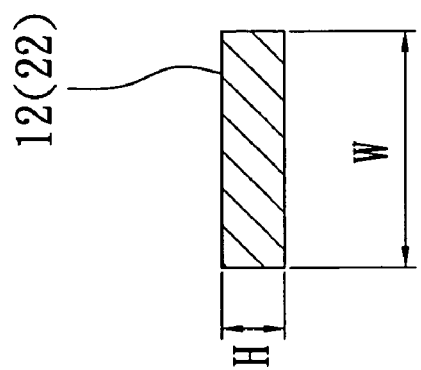
FIG. 6 is a sectional view taken along line VI—VI in FIG. 2.
Figure 4:
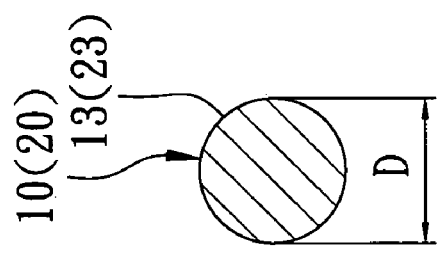
FIG. 4 is a sectional view taken along line IV—IV in FIG. 2.

As shown in FIGS. 4 and 6, the cross section of the rear end portion 12, 22 has a width (W) greater than a diameter (D) of the cross section of the intermediate portion 13, 23, and a thickness (H) smaller than the diameter (D) of the cross section of the intermediate portion 13, 23. Moreover, in this embodiment, the front end portion 11, 21 has a cross section that is generally round in shape and that has a diameter (D), which is the same as that of the intermediate portion 13, 23.

Referring again to FIG. 3, the rear end portion 12, 22 of each of the supporting members 11, 21 has a first section 122, 222 extending from the bent portion 121, 221 in the first direction away from the center line (X), and a second section 123, 223 bent and extending from the first section 122, 222 in a second direction toward the center line (X). The second direction is opposite to the first direction. The second sections 123, 223 of the rear end portion 12, 22 of the supporting members 10, 20 are fixed to and are plainly laid on the bottom surface 230 of the seat body 200. Preferably, the second sections 123, 223 of the rear end portions 12, 22 of the supporting members 10, 20 are joined together in an integral manner for facilitating manufacture and assembly of the bicycle seat.

With the inclusion of the rear end portions 12, 22 and the bent portions 121, 221 in the supporting members 10, 20 of the bicycle seat of this invention, the bicycle seat can, while maintaining a desired rigidity, provide a better shock-absorbing effect than the conventional bicycle seat.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A seat comprising:
 a seat body having a bottom surface and front and rear ends, said bottom surface of said seat body being formed with a retaining member that is disposed adjacent to said front end, said seat body having a width that increases in a direction from said front end toward said rear end, said seat body defining a center line extending from said front end to said rear end; and
 a pair of opposing supporting members secured to said bottom surface of said seat body and disposed at two opposite sides of said center line, each of said supporting members including
  a front end portion extending into said retaining member,
  an intermediate portion extending from said front end portion toward said rear end of said seat body,
  a bent portion bent from said intermediate portion, and
  a rear end portion extending from said bent portion in a first direction away from said center line;
 wherein said intermediate portion has a cross section that is generally round in shape;
 wherein said rear end portion has a cross section that is generally flat in shape; and
 wherein said bent portion has a cross section varied from a generally round shape to a flat shape as said bent portion extends from said intermediate portion to said rear end portion.

2. The seat as claimed in claim 1, wherein the cross section of said rear end portion has a width greater than a diameter of the cross section of said intermediate portion, and a thickness smaller than the diameter of the cross section of said intermediate portion.

3. The seat as claimed in claim 2, wherein said front end portion has a cross section that is generally round in shape and that has a diameter substantially equal to the diameter of the cross section of said intermediate portion.

4. The seat as claimed in claim 3, wherein said rear end portion of each of said supporting members has a first section extending from said bent portion in the first direction away from said center line, and a second section bent and extending from said first section in a second direction toward said center line, said second sections of said supporting members being fixed to and being plainly laid on said bottom surface of said seat body.

5. The seat as claimed in claim 4, wherein said second sections of said rear end portions of said supporting members are joined together in an integral manner.

* * * * *